(12) United States Patent
Spillman et al.

(10) Patent No.: US 7,210,747 B1
(45) Date of Patent: May 1, 2007

(54) SPINNER FOR A ROLLER SKATE

(76) Inventors: Jeanne L Spillman, 1316 Ironwood Dr., South Bend, IN (US) 46544; Timothy A Abbott, 1829 Nash St., South Bend, IN (US) 46613

( * ) Notice: Subject to any disclaimer, the term of this patent is extended or adjusted under 35 U.S.C. 154(b) by 125 days.

(21) Appl. No.: 10/907,808

(22) Filed: Apr. 15, 2005

(51) Int. Cl.
*B60B 7/00* (2006.01)
(52) U.S. Cl. .................. 301/37.25; 301/5.301
(58) Field of Classification Search .......... 301/37.25, 301/5.301; 40/587
See application file for complete search history.

(56) References Cited

U.S. PATENT DOCUMENTS

| | | | | |
|---|---|---|---|---|
| 4,929,030 | A | * | 5/1990 | Park .................. 301/37.25 |
| 5,659,989 | A | * | 8/1997 | Hsiao et al. ............ 40/587 |
| 6,554,370 | B2 | * | 4/2003 | Fowlkes ............. 301/37.25 |
| 6,592,189 | B1 | * | 7/2003 | Back, Sr. ............ 301/5.308 |
| 6,702,396 | B1 | * | 3/2004 | Wang ................ 301/37.25 |
| 6,874,941 | B2 | * | 4/2005 | van Egeraat ............ 384/449 |
| 2005/0067880 | A1 | * | 3/2005 | Buhler et al. ......... 301/37.35 |
| 2005/0116530 | A1 | * | 6/2005 | Simpson ............. 301/37.25 |

* cited by examiner

*Primary Examiner*—Russell Stromer
*Assistant Examiner*—Kip Kotter
(74) *Attorney, Agent, or Firm*—Leo H. McCormick, Jr.

(57) ABSTRACT

A spinner apparatus for the adornment of a wheel on a roller skate. The spinner apparatus includes a cone, a first disc and a second disc. The cone is connected to the wheel and connected to the first disc by locating a lip on its periphery in groove on the periphery of the first disc. Radial openings that extend from an axial opening in the first disc to define a first plurality of spokes while radial openings extend from an axial projection in the second disc define a corresponding second plurality of spokes therein. The axial opening receives the axial projection to position the second disc adjacent the first disc. The first disc rotates with the wheel while the second disc independently rotates such that the first and second spokes interrupt the transmission of light to provide an illusion that the wheel is rotating faster than is actually occurring.

11 Claims, 3 Drawing Sheets

SPINNER FOR A ROLLER SKATE

This invention relates to a spinner apparatus that is attached to the wheel of a roller skate.

BACKGROUND OF THE INVENTION

The wheels of a roller skate are attached to an axle through the engagement of a bearing by a nut that is affixed by threads to the axle. The type of material used in a wheel is normally determined by the surface on which a person will skate however most wheels are made from plastic such as the wheel disclosed in U.S. Pat. No. 6,592,189. In all roller skates, the material in the wheels or the bearing eventually wears requiring the replacement thereof by removing the nut from the axle. In order to enhance the appearance of a roller skate, wheels have been made of various colors that can often be selected to match an outfit of a skater. The roller skates function in an adequate manner but often a person may desire to have an appearance different from that of other skaters.

SUMMARY OF THE INVENTION

The present invention provides a spinner apparatus that is attached to the wheel to enhance the appearance of a roller skate.

In more particular detail, the spinner apparatus includes a support member, a first disc and a second disc. The support member has an annular base that is located between a bearing for the wheel and the nut through which the wheel is retained on the axle. The base has an extending outwardly cone with an inwardly projecting lip on the peripheral surface thereof that is retained in an annular groove on the peripheral surface of the first disc. The first disc has an axial bore with a first plurality of radial slots therefrom to location adjacent the peripheral surface to define a first plurality of radial spokes. The second disc has an annular axial projection that extends there from with an annular lip on the end thereof and a radial slit that extends through the axial projection a base and a second plurality of radial openings that extend from the axial projection to a location adjacent a peripheral ring thereon to define a second plurality of radial spokes. The axial projection is inserted into the axial bore on the first disc such that the annular lip engages the first disc to retain the second disc in radial alignment with the first disc. The axial projection on the second disc is free to rotate in the axial bore independent of the rotation of the cone that rotates with the wheel such that the transmission of light between the wheel and a viewer is interrupted by the first and second radial spokes on the first and second discs to provide an illusion that the wheel is rotating faster than is actually occurring.

An advantage of the invention resides in appearance of a roller skate provided by a spinner that is attached to a wheel and rotates independently of the wheel.

The present invention provides an enhanced appearance without affecting the functional movement of a wheel on a bearing of a roller skate.

DETAILED DESCRIPTION

In the various embodiments of the invention, a same component is identified by a same member.

Figure 1:
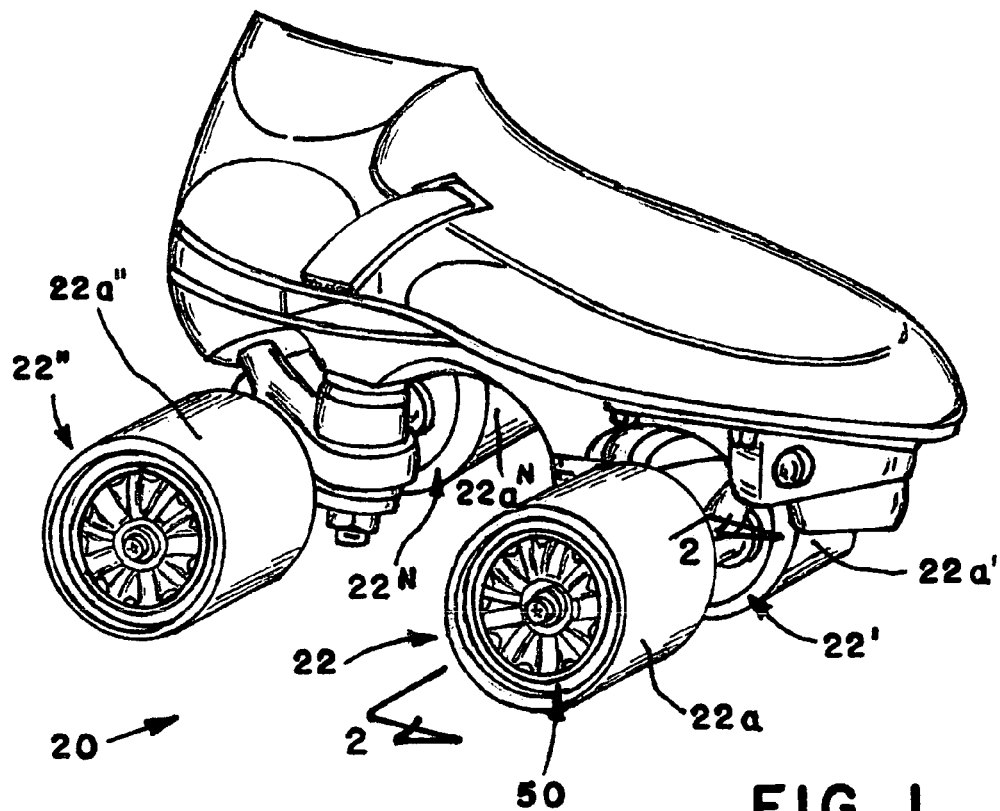
FIG. 1 is a roller skate having a spinner apparatus of the present invention attached to a wheel thereof.
Figure 2:
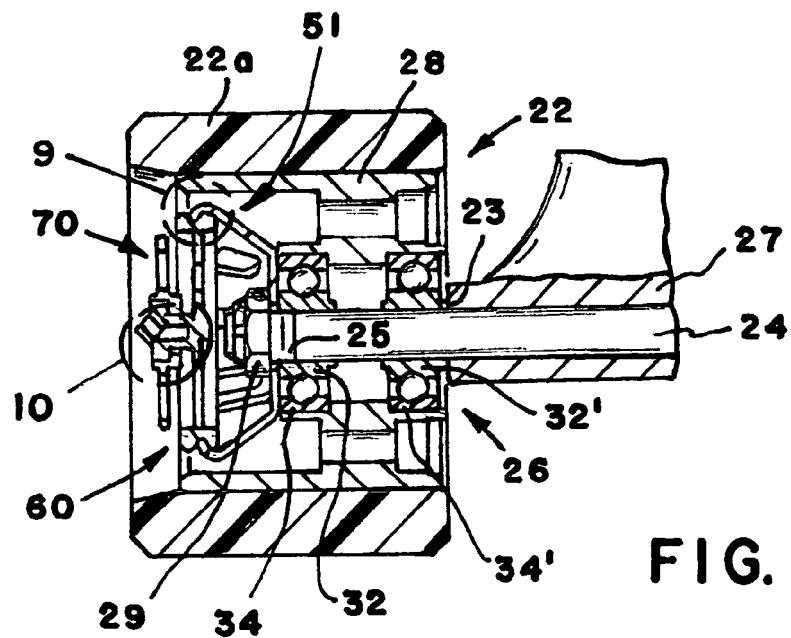
FIG. 2 is a sectional view taken along lines 2—2 of FIG. 1.

A roller skate 20 as shown in FIG. 1 has a spinner arrangement 50 of present invention attached to each wheel and bearing assembly 22, 22' . . . 22" to enhance the appearance of the roller skate 20. Wheel and bearing assemblies 22, 22' are attached to a front axle 24 of the roller skate 20 as illustrated in FIG. 2 for wheel and bearing assembly 22 while wheel and bearing assemblies 22" and 22" are attached to a rear axle (not shown). Each wheel and bearing assembly 22, 22' . . . 22" for the roller skate 20 is identical and the description hereinafter equally applies to each. A wheel and bearing assembly 22 is defined by a wheel 22a and a bearing 26, see FIG. 2. A bearing 26 includes an inner race 32 and outer race 34 that are pressed onto a hub 28 of the wheel 22a such that the bearing 26 and wheel 22a rotate on an axle 24 that extends from a truck 27 for the roller skate 20. A wheel and bearing assembly 22 is retained on axle 24 by screwing a nut 29 onto threads 25 on the axle 24 such that an inner race 32' and an outer race 34' are urged against a shoulder 23 on the axle 24. The level of torque applied to screw nut 29 onto threads to thereafter urge the inner race 32 and outer race 34 against shoulder 23 affects the rotational ease of a wheel 22a with respect to the axle 24. When a wheel and bearing assembly 22 rotates, the rotation is translated into the spinner arrangement 50 of the present invention to provide an illusion that the rotation of the spinner arrangement 50 is faster than the rotation of a wheel and bearing assembly 22.

A spinner arrangement 50 is only shown in FIG. 1 as being attached to wheels 22, 22" but most likely would also be attached to wheels 22' and 22". Each spinner arrangement 50 is identical and includes a support member 51, a first disc 60 and a second disc 70 as shown in more detail in FIGS. 2–10. The first disc 60 rotates with the wheel 22a while the second disc 70 is free to independently rotate with respect to the first disc 60 to provide the rotational illusion with respect to a wheel 22.

Figure 3:
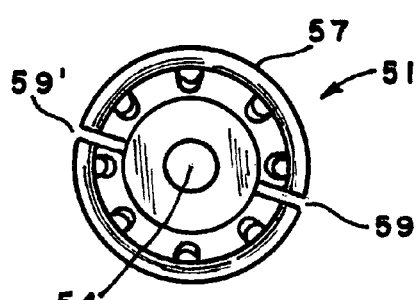
FIG. 3 is an end elevation view of the cone for the spinner apparatus of FIG. 2.
Figure 4:
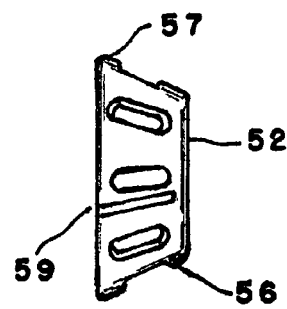
FIG. 4 is a side view of the cone of FIG. 3.
Figure 9:
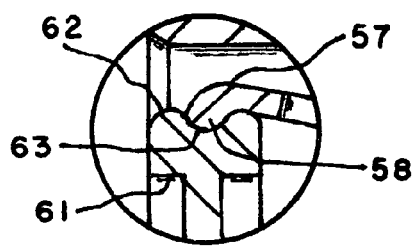
FIG. 9 is a view taken along conscribed line 9 of FIG. 2.
Figure 10:
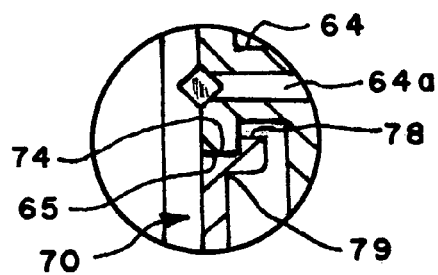
FIG. 10 is a view taken along conscribed line 10 of FIG. 2.

The support member 51 defined by a cone is shown in more particular detail in FIGS. 3 and 4 and includes an annular base 52 with an opening 54 therein and a cone 56 that extends outwardly from the base 52. The cone 56 has a peripheral surface 57 with a first inwardly projecting lip 58 as shown in FIG. 9 and at least first 59 and second 59' radial slits or radial slots that extend from the base 52 to the peripheral surface 57 as shown in FIGS. 3 and 4.

Figure 5:
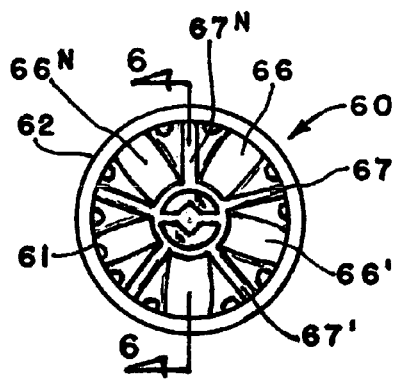
FIG. 5 is an end elevation view of a first disc for use in the spinner apparatus of FIG. 2.
Figure 6:
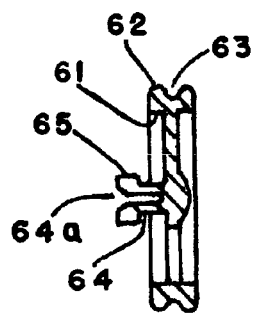
FIG. 6 is a sectional view taken along line 6—6 of FIG. 5.

The first disc 60 is shown in more detail in FIGS. 5 and 6 as having a peripheral surface 62 having an annular groove 63 located thereon and an axial projection 64 that extends therefrom with an outward extending annular rib or lip 65. The body of the first disc 60 has a first plurality of radial slots 66,66' . . . 66" that extend from adjacent the axial projection 64 to a location defined by ring 61 adjacent the peripheral surface 62 to define a first plurality of radial spokes 67,67' . . . 67". The radial spokes 67, 67' . . . 67", each have an ornamental shape that is best shown in FIG. 5 as a triangle with an apex adjacent the first axial projection 64 and a base that is part of ring 61. The axial projection 64 has an axial radial slot 64a that extends through the annular rib 65 such that the annular rib 65 may flex inwardly with respect to the axis of the axial projection 64. The first disc 60 is made from a plastic material that is coated with a reflective material.

Figure 7:
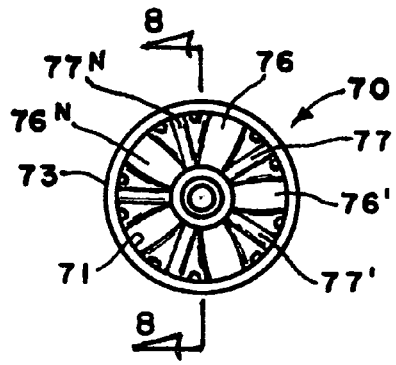
FIG. 7 is an end elevation view of a second disc for use in the spinner apparatus of FIG. 2.
Figures 8, 8A:
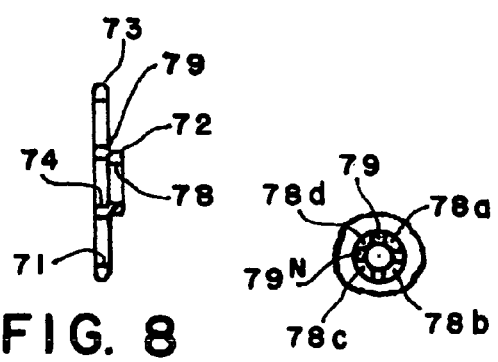
FIG. 8 is a sectional view taken along line 8—8 of FIG. 7.
FIG. 8a is an end view of the second disc of FIG. 7.

The second disc 70 is shown in more detail in FIGS. 7 and 8 as having a body with an annular axial projection 72 extending there from with a bore 74 in the annular axial projection 72. The body of the second disc 70 has a plurality of radial slots 76,76' . . . 76" that extend from adjacent the annular axial projection 72 to a location defined by ring 72 adjacent the peripheral surface 73 of the second disc 70 to define a first plurality of radial spokes 77,77' . . . 77". The radial spokes 77,77' . . . 77", each have an ornamental shape that is illustrated in FIG. 7 as being triangle with an apex adjacent the first axial projection 72 and a base that is located on and part of ring 71 to define a fin that may be effected by the flow of air. The annular axial projection 72 has inwardly extending annular lip or rib 78 thereon that has a smaller diameter than bore 74. The annular axial projection 72 has a plurality of axial slots 79,79' . . . 79", see FIG. 8a , such that the resulting lip 78 may flex outwardly with respect to the axis of bore 74. The second disc 70 is made from a plastic material that is coated with a reflective material and may also have glass gems attached to the center and or the fins to further provide for the appearance of the spinner arrangement 50.

A spinner arrangement 50 is attached to a wheel and bearing assembly 22 by placing the cone 51 on the axle 24 between the nut 29 and bearing 26 as illustrated in FIG. 2. The nut 29 is tightened to a desired torque and now when the wheel and bearing assembly 22 rotates on axle 24, the cone 51 rotates at the same time and with the same speed. The first disc 60 is pushed into the cone 51 and rib or lip 58 on cone 51 is received in groove 63 as shown in FIG. 9. As the first disc 60 is being pushed onto the cone 51, the radial slots 59, 59' in cone 51 allow for some flexibility and yet a secure and tight joint is achieved as illustrated in FIG. 9 such that the first disc 60 rotates with the cone 51. The inwardly annular rib or lip 78 on the second disc 70 engages the outward annular rib or lip 65 on the first disc 60 such that the sections of the annular rib 64 created by slot 64a flex inward and the sections 78a, 78, 78c and 78d forming the annular rib or lip 78 created by slots 79,79' . . . 79" flex outward and annular lip or rib 78 moves past the annular rib or lip 65 and flexes back to a position to fix and align the second disc 70 in a parallel plane with respect to the first disc 60. The material surrounding the axial bore 74 on the second disc 70 engages and bears on the annular rib or lip 65 in such a manner that the second disc 70 is free to rotate on the annular rib or lip 65 and yet is secured to the first disc 60 by the relationship of the rib or lip 78 and rib or lip 65.

Figure 11:
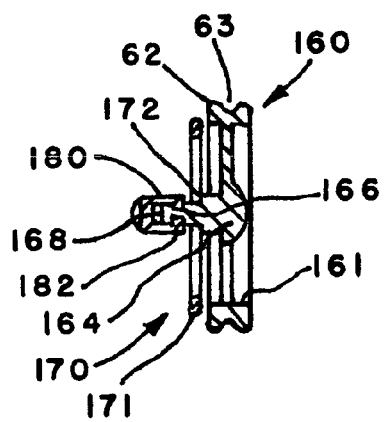
FIG. 11 is a sectional view illustrating a relationship between a first disc and second disc of a secondary embodiment of the invention.

Another embodiment for the first 160 and second 170 disc of a spinner arrangement 50 is illustrated in FIG. 11 to provide an alternate structure for attaching a first 60 and second disc 70 together and to a cone 51. In this embodiment, the first disc 160 has a body with a peripheral surface 62 having a annular groove 63 located thereon and an axial projection or shaft 164 extending therefrom with a second annular groove 166 located adjacent an end 168 thereof. As with disc 60, the first disc 160 has a first plurality of radial slots 66,66' . . . 66" that extend from adjacent the axial projection or shaft 164 to a location defined by ring 161 adjacent the peripheral surface 62 to define a first plurality of radial spokes 67,67' . . . 67" as in the first disc 60. The annular groove 63 on disc 160 receives lip 58 on cone 51 to join the first disc 160 with the cone 51.

The second disc 170 has a body with an annular axial bore 172 therein to receive the axial shaft 164 on the first disc 160 and as with the second disc 70, the second disc 170 has a plurality of radial slots 76, 76' . . . 76" that extend from adjacent the annular axial projection 72 to a location defined by ring 171 adjacent the peripheral surface 73 of the second disc 70 to define a first plurality of radial spokes 77, 77' . . . 77".

A retainer member 180 defined by a cap with tangs 182 thereon located in the annular groove 166 on annular shaft 164 locates the second disc 170 on axial shaft 164 in radial alignment with the first disc 160. The axial bore 172 is such that the second disc 170 is free to rotate on the axial shaft 164. The first disc 160 rotates with the cone 51 such the transmission of light between the wheel and a viewer is interrupted by the first 67,67' . . . 67" and second 77, 77' . . . 77" radial spokes on the first disc 160 and second disc 170 respectively thus providing an illusion that the wheel is rotating faster than actually is occurring.

Figure 12:
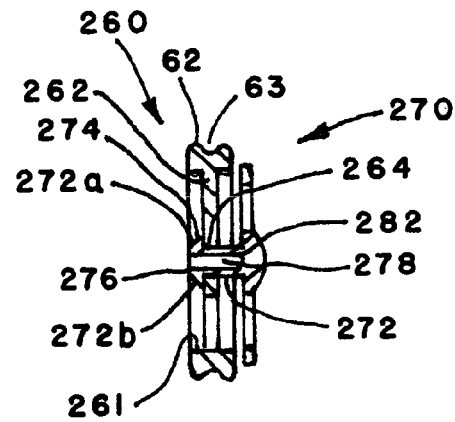
FIG. 12 is a sectional view illustrating a relationship between a first disc and a second disc of another embodiment of the invention.

Another further embodiment of the spinner arrangement 50 is illustrated by the first 260 and second 270 disc in FIG. 12 to provide an alternate structure for attaching the first 260 and second disc 270 to each other and to a cone 51. In this embodiment, a first disc 260 has a body 262 with a peripheral surface 62 having first annular groove 63 located thereon and an axial bore 264. As with disc 60, disc 260 has first plurality of radial slots 66,66' . . . 66" that extend from adjacent the axial bore 264 to a location defined by ring 261 adjacent the peripheral surface 62 to define a first plurality of radial spokes 67,67' . . . 67" as in the first disc 60. The annular groove 63 on disc 260 receives lip 58 on cone 51 to join the first disc 260 with the cone 51.

The second disc 270 has a body with an annular axial projection 272 extending there from with an annular outward extending flange 274 on the end 276 thereof and a radial slit 278 that extends through the axial projection 272 from the end 276 thereof to a point adjacent a base 282 of the second disc 270 to define first 272a and second 272b sections of the annular axial projection 272. As with the second disc 70, the second disc 270 has a plurality of radial slots 76,76' . . . 76" that extend from adjacent the annular axial projection 272 to a location defined by ring 71 adjacent the peripheral surface 73 of the second disc 270 to define a first plurality of radial spokes 77,77' . . . 77". The first 272a and second 272b sections of the axial projection 272 on being inserted into the axial bore 264 on first disc 260 flexes inwardly such that the annular flange 274 passes through the first disc 260 and thereafter flexes outwardly such that the annular flange 274 engages the first disc 260 to retain the second disc 270 in radial alignment with the first disc 260. The axial projection 272 on the second disc 270 is free to rotate in axial bore 264 independent of the rotation of the cone 51 such that the transmission of light between the wheel and a viewer is interrupted by the first 67, 67' . . . 67" and second 77, 77' . . . 77" radial spokes on the first 260 and second 270 discs to provide an illusion that the wheel is rotating faster than is actually occurring.

MODE OF OPERATION

The wheel and bearing assemblies 22, 22' . . . 22" of a roller skate 20 rotate as a person moves from one location to another location. The spinner apparatus 50 in each of the embodiments function in a same manner in that the first disc 60 is fixed to the bearing 26 and as a result rotates at a same number of revolutions as the bearing 26 while the second disc 70 is free to rotate on the rib 65 as a function of the frictional engagement of the surface of bore 74 and rib 65 but may in actuality rotate at a lesser speed, as when the wheel and bearing assembly stop rotating, it may continue to rotate due to inertia. A person viewing the rotation of the second disc 70 and the rotation of the first disc 60 is provided with an illusion that the wheel may be rotating at a faster rate than is actually occurring since the transmission of light between the wheel and a viewer is interrupted or changed by the reflection of first 67, 67' . . . 67" and second 77, 77' . . . 77" radial spokes. In addition such rotation of the spinner apparatus 50 provides or may enhance the appearance of the roller skate 20.

What is claimed is:

1. In a roller skate having an axle with a bearing and wheel retained thereon by a nut such that the wheel freely rotates on the axle, a spinner apparatus secured to said wheel to enhance the appearance of that wheel comprising:

a support member having an annular base with an opening therein and a cone the extends outwardly from the base, said cone having a peripheral surface with a first inwardly projecting lip thereon, said base engaging and rotating with said wheel;

a first disc having a peripheral surface with an annular groove located thereon and a first axial projection shaft with an outward extending annular rib, said first disc having a first plurality of radial slots therein that extend from adjacent the first axial projection shaft to a location adjacent the peripheral surface to define a first plurality of radial spokes, said annular groove receiving said first inwardly projecting lip to secure said first disc to said cone; and a second disc having a second annular axial projection shaft with a bore therein to receive said first annular rib on said first axial projection shaft on said first disc, said second annular axial projection shaft having an inwardly extending annular rib thereon, said first axial projection shaft initially flexing inward and said second annular projection shaft initially flexing outward on engagement of said inward annular rib with said outward annular rib as said second disc is moved toward said first disc and later reversing the flexing directions as the inward annular rib moves past the outward annular rib to be located on first axial projection shaft of said first disc to retain said second disc in radial alignment with said first disc, said second disc having a second plurality of radial openings thereon that extend from a location adjacent said annular axial projection shaft to a location adjacent a peripheral ring thereon to define a second plurality of radial spokes, said second disc being free to rotate on said axial projection shaft as said first disc rotates with said cone such that the transmission of light between the wheel and a viewer is interrupted by the first and second radial spokes on the first and second discs to provide an illusion that the wheel is rotating faster than actually is occurring.

2. The roller skate as recited in claim 1 wherein said first plurality of spokes rotate at a same rate as said wheel while said second plurality of spokes rotate at a different rate that is a function of a frictional relationship between said second inwardly projecting lip and said axial projection shaft.

3. The roller skate as recited in claim 2 wherein each of said second plurality of spokes have a fin that respond to air flow to assist in independently rotating the second disc with respect to said wheel.

4. The roller skate as recited in claim 3 wherein each fin is adorned with a reflective coating.

5. The roller skate as recited in claim 4 wherein said cone includes first and second radial slits such that said first disc may be removed from said support member.

6. In a roller skate having an axle that receives a bearing that engages a rim for a wheel, said bearing being retained on said axle by a nut such that the wheel freely rotates on the axle, the improvement wherein a spinner apparatus is secured to said wheel to enhance the appearance of the roller skate comprising:

a support member having an annular base with an opening therein and a cone that extends outwardly from the base, said cone having a peripheral surface with a first inwardly projecting lip thereon, said base being fixed to said rim of said wheel and rotating therewith on said bearing;

a first disc having a peripheral surface with a first annular groove located thereon and an annular axial shaft extending therefrom with a second annular groove located adjacent an end thereof, said first disc having a first plurality of radial slots therein that extend from adjacent the axial shaft to a location adjacent the peripheral surface to define a first plurality of radial spokes, said first annular groove receiving said first inwardly projecting lip to secure said first disc to said cone;

a second disc having an annular axial bore therein to receive said axial shaft of said first disc, said second disc having a second plurality of radial openings that extend from a location adjacent said annular axial shaft to a location adjacent a peripheral ring thereon to define a second plurality of radial spokes; and a retainer member located in said second annular groove on said annular axial shaft to locate said second disc on said axial shaft and in radial alignment with said first disc, said second disc being free to rotate on said axial shaft as said first disc rotates with said cone such the transmission of light between the wheel and a viewer is interrupted by the first and second radial spokes on the first and second discs to provide an illusion that the wheel than rotating faster than actually is occurring.

7. The roller skate as recited in claim 6 wherein said first plurality of spokes rotate at a same rate as said wheel while said second plurality of spokes rotate at a different rate that is a function of a frictional relationship between said annular axial bore and said axial shaft.

8. The roller skate as recited in claim 7 wherein each of said second plurality of spokes have a fin that responds to air flow to assist in independently rotating the second disc with respect to said wheel.

9. The roller skate as recited in claim 8 wherein each fin is adorned with a reflective coating.

10. The roller skate as recited in claim 9 wherein said cone includes first and second radial slits such that said first disc may be removed from said support member.

11. In a roller skate having an axle that receives a bearing that engages a rim for a wheel, said bearing being retained on said axle by a nut such that the wheel freely rotates on the axle, the improvement wherein a spinner apparatus is secured to said wheel to enhance the appearance of the roller skate comprising:

a support member having an annular base with an opening therein and a cone that extends outwardly from the base, said cone having a peripheral surface with an inwardly projecting lip thereon, said base being fixed to said rim of said wheel and rotating therewith on said bearing;

a first disc having a peripheral surface with a first annular groove located thereon and an axial bore, said first disc having a first plurality of radial slots therein that extend from adjacent the axial bore to a location adjacent the peripheral surface to define a first plurality of radial spokes, said first annular groove receiving said inwardly projecting lip to secure said first disc to said cone; and a second disc having an annular axial projection extending with an annular flange on the end thereof and a radial slit that extends through said axial projection from a tip thereof to a point adjacent a base of said second disc to define first and second sections for said annular axial projection, said second disc having a second plurality of radial openings that extend from a location adjacent said axial projection to a location adjacent a peripheral ring thereon to define a second plurality of radial spokes, said first and second sections of said annular flange on said axial projection on being inserted into said axial bore on said first disc flexing inwardly such that said annular flange passes through said first disc and thereafter flexing outwardly such that said annular flange engages said first disc to retain said second disc in radial alignment with said first disc, said axial projection on the second disc being free to rotate in said axial bore independent of the rotation of said cone such the transmission of light between the wheel and a viewer is interrupted by the first and second radial spokes on the first and second discs to provide an illusion that the wheel than rotating faster than actually is occurring.

* * * * *